United States Patent
Fujita

(10) Patent No.: US 10,371,078 B2
(45) Date of Patent: Aug. 6, 2019

(54) ENGINE STARTER CONTROLLER, ENGINE START APPARATUS, AND ENGINE STARTER CONTROL SYSTEM

(71) Applicant: DENSO CORPORATION, Kariya, Aichi-pref. (JP)

(72) Inventor: Tatsuya Fujita, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/821,903

(22) Filed: Nov. 24, 2017

(65) Prior Publication Data
US 2018/0149106 A1 May 31, 2018

(30) Foreign Application Priority Data

Nov. 25, 2016 (JP) .................................. 2016-229225

(51) Int. Cl.
*F02D 41/22* (2006.01)
*F02N 11/08* (2006.01)
(Continued)

(52) U.S. Cl.
CPC ......... *F02D 41/221* (2013.01); *F02D 41/062* (2013.01); *F02D 41/3005* (2013.01);
(Continued)

(58) Field of Classification Search
CPC ............... F02N 11/006; F02N 11/0818; F02N 11/0848; F02N 11/108; F02N 11/04;
(Continued)

(56) References Cited

U.S. PATENT DOCUMENTS

| | | | | |
|---|---|---|---|---|
| 2004/0036296 A1* | 2/2004 | Blackburn | ............... | F02N 11/04 290/48 |
| 2008/0264374 A1* | 10/2008 | Harris | ....................... | E02F 9/20 123/179.3 |
| 2016/0290305 A1* | 10/2016 | Kinoshita | ........... | F02N 11/0866 |

FOREIGN PATENT DOCUMENTS

| | | | | |
|---|---|---|---|---|
| FR | 2839119 A1 * | 10/2003 | ............ | F02N 11/006 |
| FR | 2962770 A1 * | 1/2012 | ............ | F02N 11/006 |

(Continued)

OTHER PUBLICATIONS

JP2004124914 A (Kashimoto et al.) Apr. 22, 2004 (machine translation) [online] [retrieved on Dec. 11, 2018]. Retrieved from EPO database.*

*Primary Examiner* — Mahmoud Gimie
(74) *Attorney, Agent, or Firm* — Oliff PLC

(57) ABSTRACT

A starter controller incorporated in a starter control system for controlling actuation of a first starter and a second starter to start an engine. The second starter is an alternating-current (AC) starter. The starter control system actuates the first starter in response to an engine start-up request, deactivates the first starter before completion of engine start-up, and activates the second starter while the second starter is being rotated by rotation of an engine rotary shaft. In the starter controller, a determination unit is configured to, under a condition where the engine rotary shaft is rotating after deactivation of the first starter, determine whether or not recognition of rotation of the second starter is complete. A fail-safe unit is configured to, if the recognition of rotation of the second starter is complete, perform predefined fail-safe processing responding to an abnormality in the second starter.

13 Claims, 6 Drawing Sheets

(51) Int. Cl.
 F02N 11/00 (2006.01)
 F02N 11/10 (2006.01)
 F02D 41/06 (2006.01)
 F02D 41/30 (2006.01)
 F02D 41/26 (2006.01)
 F02N 11/04 (2006.01)
 F02N 15/06 (2006.01)
 F02N 15/08 (2006.01)

(52) U.S. Cl.
 CPC ............ F02N 11/006 (2013.01); F02N 11/08 (2013.01); F02N 11/0818 (2013.01); F02N 11/0848 (2013.01); F02N 11/108 (2013.01); F02D 41/26 (2013.01); F02N 11/04 (2013.01); F02N 15/067 (2013.01); F02N 15/08 (2013.01); F02N 2200/0801 (2013.01); F02N 2200/101 (2013.01); F02N 2200/102 (2013.01); F02N 2300/2002 (2013.01); F02N 2300/302 (2013.01)

(58) Field of Classification Search
 CPC ........ F02N 11/08; F02N 15/067; F02N 15/08; F02N 2200/0801; F02N 2200/101; F02N 2200/102; F02N 2300/2002; F02N 2300/302
 USPC .......................................................... 701/113
 See application file for complete search history.

(56) References Cited

FOREIGN PATENT DOCUMENTS

| JP | 2004-003434 | A | | 1/2004 |
| JP | 2004124914 | A | * | 4/2004 |
| JP | 2006-233977 | A | | 9/2006 |
| JP | 4421567 | B2 | | 2/2010 |

* cited by examiner

ENGINE STARTER CONTROLLER, ENGINE START APPARATUS, AND ENGINE STARTER CONTROL SYSTEM

CROSS-REFERENCE TO RELATED APPLICATION

This application is based on and claims the benefit of priority from earlier Japanese Patent Application No. 2016-229225 filed Nov. 25, 2016, the description of which is incorporated herein by reference.

BACKGROUND

Technical Field

The present invention relates to an engine starter controller, an engine start apparatus, and an engine starter control system for controlling start-up of a vehicle engine.

Related Art

Several engine start-up methods using two starters are known. In these methods, in the initial stage of engine start-up where a large torque is required, a gear drive starter is actuated, and after deactivation of the gear drive starter, a rotary electric machine including an alternating current (AC) driven motor, such as an integrated starter generator (ISG), is actuated. For example, an engine start apparatus disclosed in Japanese Patent No. 4421567 cranks the engine using a starter until first ignition, and after deactivation of the starter, cranks the engine using the ISG until engine ignition has been completed. This can downsize the ISG and reduce costs as compared with when the engine is started using the ISG only.

However, in such an engine start-up method using both the starter and the rotary electric machine, as disclosed in Japanese Patent No. 4421567, activation of the rotary electric machine may be delayed by some factor, or an operating abnormality may occur where the rotary electric machine can not be actuated. For example, when motoring actuating the rotary electric machine, detection of a rotating state of the rotary electric machine and a phase to be excited for motoring actuation of the rotary electric machine may be delayed more than normal. In such an event, initiation of motoring actuation of the rotary electric machine may be delayed, which may deteriorate engine start-up performance.

In consideration of the foregoing, exemplary embodiments of the present invention are directed to providing a technique for properly detecting an abnormality in a second starter that is actuated after deactivation of a first starter, thereby preventing deterioration of engine start-up performance.

SUMMARY

In accordance with an exemplary embodiment of the present invention, there is provided a starter controller incorporated in a starter control system for controlling actuation of a first starter and a second starter to start an engine. The second starter is an alternating-current (AC) starter. The starter control system is configured to actuate the first starter in response to an engine start-up request, deactivate the first starter before completion of engine start-up, and activate the second starter while the second starter is being rotated by rotation of an engine rotary shaft. The starter controller includes: a determination unit configured to, under a condition where the engine rotary shaft is rotating after deactivation of the first starter, determine whether or not recognition of rotation of the second starter is complete; and a fail-safe unit configured to, if it is determined by the determination unit that the recognition of rotation of the second starter is complete, perform predefined fail-safe processing responding to an abnormality in the second starter.

After activation of the first starter, the second starter is rotated by rotation of the engine rotary shaft. During such co-rotation of the second starter, that is, while the second starter is being rotated by rotation of an engine rotary shaft, recognition of rotation of the second starter is performed. After completion of the recognition of rotation of the second starter, motoring actuation of the second starter is initiated based on a recognition result. Unless the recognition of rotation of the second starter is properly performed, initiation of motoring actuation of the second starter may be impaired, which may adversely affect the engine start-up.

In the configuration set forth above, the starter controller is configured to, under a condition where the engine rotary shaft is rotating after deactivation of the first starter, determine whether or not recognition of rotation of the second starter is complete, and if it is determined that the recognition of rotation of the second starter is not complete, perform predefined fail-safe processing responding to an abnormality in the second starter. With this configuration, determining that the recognition of rotation of the second starter is not complete, under a condition where, after deactivation of the first starter, the second starter is being rotated by rotation of the engine rotary shaft, allows it to assume that there is an abnormality in the second starter. Performing the predefined fail-safe processing in such an event allows a rapid response to an operating abnormality in motoring actuation of the second starter. With this configuration, an abnormality in the second starter can be appropriately detected, which can prevent deterioration of engine start-up performance.

In accordance with another exemplary embodiment of the present invention, there is provided an engine start apparatus including: a starter controller incorporated in a starter control system for controlling actuation of a first starter and a second starter to start an engine, the system being configured to actuate the first starter in response to an engine start-up request, deactivate the first starter before completion of engine start-up, and activate the second starter while the second starter is being rotated by rotation of an engine rotary shaft; the second starter that is an alternating-current (AC) starter; and a rotation detector configured to detect rotation of the second starter based on an induced voltage or induced current generated in coils of the second starter. The starter controller includes: a determination unit configured to, under a condition where the engine rotary shaft is rotating after deactivation of the first starter, determine whether or not recognition of rotation of the second starter is complete; and a fail-safe unit configured to, if it is determined by the determination unit that the recognition of rotation of the second starter is complete, perform predefined fail-safe processing responding to an abnormality in the second starter.

In the engine start apparatus configured as above, rotation of the second starter is detected based on an induced voltage or current generated in conjunction with rotation of coils of the second starter. However, recognition of rotation of the second starter based on phase detection may not be stable, and thus the recognition of rotation of the second starter may be delayed. In addition, a delay of the recognition of rotation of the second starter may lead to reduction of the engine speed, which may make the recognition of rotation of the second starter more difficult.

The engine start apparatus provided with the starter controller configured as above is capable of detecting such a recognition delay and performing prescribed fail-safe processing. For example, this allows a rapid response to a delay of activation of the second starter, which can prevent deterioration of engine start-up performance.

In accordance with still another exemplary embodiment of the present invention, there is provided a starter control system for controlling actuation of a first starter and a second starter to start an engine, the system being configured to actuate the first starter in response to an engine start-up request, deactivate the first starter before completion of engine start-up, and activate the second starter while the second starter is being rotated by rotation of an engine rotary shaft. The starter control system includes: a first controller configured to control actuation of the first starter; and a second controller configured to control actuation of the second starter that is an alternating-current (AC) starter, the second controller being communicable with the first controller. The second controller includes: a determination unit configured to, under a condition where the engine rotary shaft is rotating after deactivation of the first starter, determine whether or not recognition of rotation of the second starter is complete; and a fail-safe unit configured to, if it is determined by the determination unit that the recognition of rotation of the second starter is complete, perform predefined fail-safe processing responding to an abnormality in the second starter. The fail-safe unit of the second controller is configured to, in the predefined fail-safe processing, output a signal for re-actuating the first starter. The first controller is configured to, upon receipt of the signal for re-actuating the first starter from the second controller, re-actuate the first starter.

In the starter control system configured as above, if it is determined that recognition of the second starter is not complete, that is, even if the engine speed is slowed down after deactivation of the first starter, reactuation of the first starter allows the engine speed to increase again.

DESCRIPTION OF SPECIFIC EMBODIMENTS

Figure 1A:
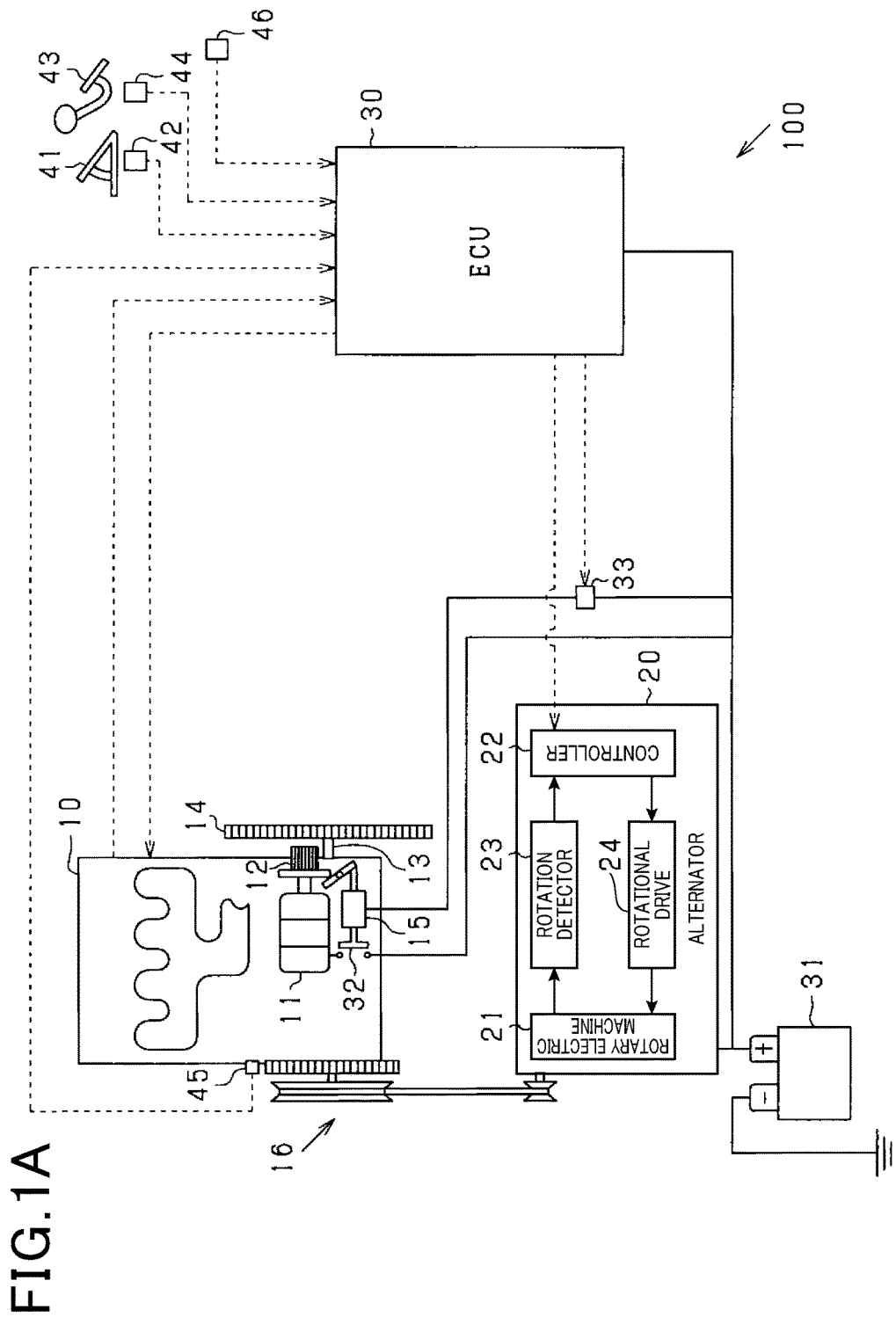
FIG. 1A is a schematic diagram of a starter control system in accordance with one embodiment of the present invention.

Example embodiments will now be described more fully with reference to the accompanying drawings. Example embodiments are provided so that this disclosure will be thorough, and will fully convey the scope to those who are skilled in the art. Numerous specific details are set forth such as examples of specific components to provide a thorough understanding of embodiments of the present disclosure. It will be apparent to those skilled in the art that example embodiments may be embodied in many different forms and should not be construed to limit the scope of the disclosure. Identical or equivalent components or components of equal or equivalent action are thereby identified by the same or similar reference numerals.

A starter control system 100 in accordance with one embodiment of the present invention will now be described with reference to FIG. 1A. The starter control system 100 of the present embodiment may be mounted in a vehicle driven by an engine 10 as a driving source. The engine 10 may be a multicylinder engine driven by combustion of fuel, such as gasoline or light oil, and contains a fuel injection valve and an igniter.

The engine 10 is provided with a first starter 11 that is a gear drive starter. A pinion 12 is coupled to a rotary shaft of the starter 11 such that the pinion 12 can mate with a ring gear 14 coupled to an engine rotary shaft 13. The starter 11 is provided with a solenoid 15 for pushing the pinion 12 against the ring gear 14, thereby allowing the pinion 12 to mate with the ring gear 14. The solenoid 15 serves as a drive for the pinion 12. Upon start-up of the engine 10, actuation of the solenoid 15 allows the pinion 12 to move in an axis direction to mate with the ring gear 14. Dynamical power of the starter 11 can thereby be transferred to the engine rotary shaft 13.

The starter 11 is electrically connected to a battery 31, where the solenoid 15 is electrically connected to the battery 31 through a relay 33. Power is supplied from the battery 31 to the solenoid 15 when the relay 33 is in a conducting state. The pinion 12 is then pushed to an engaged position with the ring gear 14. The switch 32 is thereby turned on. When the switch 32 is turned on, the starter 11 is placed in a rotating state. When the relay 33 is in a nonconducting state, power supply from the battery 31 to the solenoid 15 is interrupted. A restoring force of a spring (not shown) allows the pinion 12 to return to an original position (i.e., a position before actuation of the solenoid 15) to thereby un-mesh the pinion 12 and the ring gear 14 from each other. The switch 32 is thereby turned off and rotation of the starter 11 is terminated. The relay 33 is placed in the conducting or nonconducting state in response to the starter actuation signal (described later) from the ECU 30.

A belt-drive alternator 20 is connected to the engine rotary shaft 13 via a power transfer assembly 16 containing a pulley and a belt. The alternator 20 is always drivably coupled to the engine rotary shaft 13 via the power transfer assembly 16. The alternator 20 serves as an electrical motor when applying a driving force to the engine rotary shaft 13. The alternator 20 serves as a power generator when converting a driving power of the engine 10 into electrical power.

The starter 11 is a starter configured to be turned on or off in response to a starter actuation command. The alternator 20 is an engine start apparatus that is motoring actuated and capable of rotational speed control. The starter 11 is a low-speed starter that can generate a relatively large torque, and the alternator 20 is a high-speed engine start apparatus.

The alternator 20 includes a rotary electric machine 21, a controller 22, a rotation detector 23 configured to detect a current passing through the rotary electric machine 21, and a rotational drive 24 configured to supply power to the rotary electric machine 21. The rotary electric machine 21 is configured as a three-phase AC rotary electric machine and includes a rotor coil wound around a rotor and a stator coil wound around a stator. The rotational drive 24 is an inverter circuit including a plurality of metal-oxide semiconductor field-effect transistors (MOSFETs) as switching elements. The rotational drive 24 includes capabilities for converting direct-current (DC) power from the battery 31 into alternating-current (AC) power to supply the AC power to the rotary electric machine 21 and converting alternating-current (AC) power from the rotary electric machine 21 into direct-current (DC) power to supply the DC power to the battery 31.

The battery 31 corresponds to a power-supply apparatus to supply power to both the starter 11 and the alternator 20. In the present embodiment, the rotary electric machine 21 corresponds to a second starter.

The controller 22 is configured to conduct rotational speed control of the alternator 20. When the alternator 20 serves as an electrical motor, the rotational drive 24 is actuated to convert the DC power from the battery 31 into three-phase power to thereby supply the three-phase power to the stator. The controller 22 then controls the rotational drive 24 using a current value detected by the rotation detector 23, thereby controlling the rotational speed of the rotary electric machine 21 to a target rotational speed.

When the alternator 20 serves as a power generator, an alternating current (AC) induced electromotive force is generated in the stator. A frequency of the AC induced electromotive force is depends on the rotational speed of the rotary electric machine 21. Therefore, rotation information of the rotary electric machine 21 can be acquired by the rotation detector 23 detecting the induced electromotive force.

In the present embodiment, the alternator 20 includes no rotation sensor. That is, the alternator 20 is sensorless. The rotation detector 23 detects an induced voltage or induced current that is generated in the rotor coil or stator coil as the rotor of the rotary electric machine 21 rotates. Based on the induced voltage or induced current detected by the rotation detector 23, the controller 22 detects a rotating state of the rotary electric machine 21 and a phase to be excited in the rotary electric machine 21. Based on the detected phase, the controller 22 initiates motoring actuation of the rotary electric machine 21. That is, when the rotating state of the rotary electric machine 21 and the phase to be excited in the rotary electric machine 21 are detected, motoring actuation of the alternator 20 is initiated.

Acquisition of the rotational speed of the rotary electric machine 21 by detecting the rotating state of the rotary electric machine 21 allows an engine speed NE that is a rotational speed of the engine rotary shaft 13 to be acquired using the rotational speed of the rotary electric machine 21 and a speed reduction ratio of the power transfer assembly 16. The engine rotary shaft 13 is connected to a drive wheel through a clutch and a transmission (not shown). Such a configuration is well-known. Therefore, description thereof will be omitted.

The starter control system 100 includes an electronic control unit (ECU) 30 configured to perform engine control. The ECU 30 includes at least a microcomputer to control the engine 10 based on readings of various sensors. The ECU 30 is communicatively connected to the controller 22. That is, the ECU 30 is in communication with the controller 22.

In the starter control system 100, the ECU 30 corresponds to a first controller, and the controller 22 corresponds to a second controller. The second controller is configured to control the second starter, that is, the rotary electric machine 21. The ECU 30 is electrically connected to and powered by the battery 31.

The various sensors may include at least an accelerator sensor 42 configured to detect a depression amount of an accelerator pedal 41, a brake sensor 44 configured to detect a depression amount of a brake pedal 43, a rotational speed sensor 45 configured to detect a rotational speed of the engine rotary shaft 13 every predetermined rotation angle, and a vehicle speed sensor 46 configured to detect a vehicle speed. Detection signals from these sensors are sequentially inputted to the ECU 30. Although not shown in FIG. 1A, sensors other than these sensors may be included in the starter control system 100.

The ECU 30 is configured to, based on a reading of each sensor, perform engine control, such as fuel injection quantity control using a fuel injection valve and ignition control using an igniter, and on/off control actuation of the starter 11. The ECU 30 is further configured to perform stop-and-go control, where the engine 10 is automatically stopped if a predetermined automatic stop condition is met, and if a predefined restart condition is met under a condition where the engine is stationary after being automatically stopped, the engine 10 is automatically restarted. The predefined stop and restart conditions may include the vehicle speed, accelerating, braking and other actions.

Figure 2:
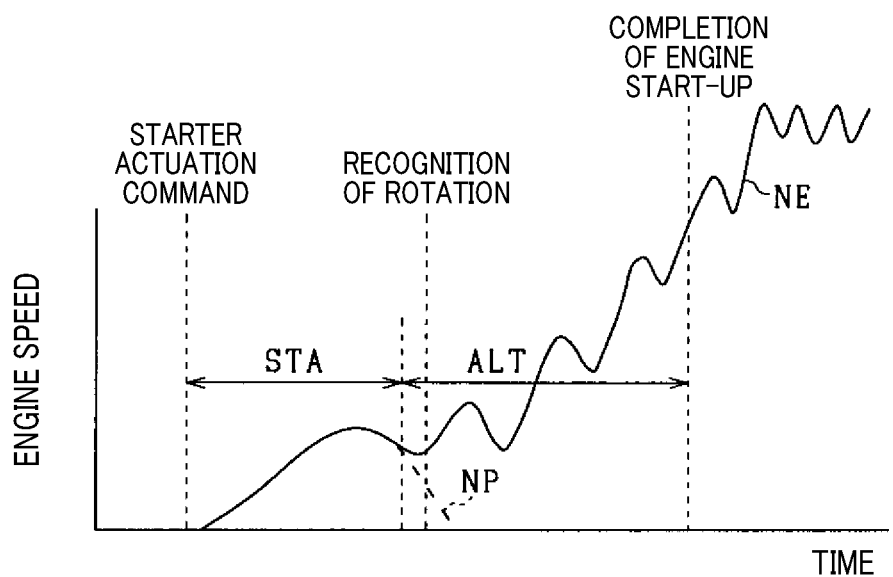
FIG. 2 is an example of engine start-up using both a starter and an alternator.

In the present embodiment, upon each of initial start-up and automatic restart of the engine 10, engine start-up is performed using both the starter 11 and the alternator 20. In such an engine start-up method, the engine 10 is started by actuating the starter at the initial stage of engine rotation where a large torque is required and then motoring actuating the alternator 20. The engine start-up method using both the starter 11 and the alternator 20 will now be described with reference to FIG. 2. In FIG. 2, the actuation command for the starter 11 is turned off after engine start is initiated by actuation of the starter 11, and then an actuation command for the alternator 20 is generated. In the present embodiment, actuation time periods of the starter 11 and the alternator 20 do not overlap.

First, when a starter actuation command is generated in the ECU 30 in response to an engine start-up request, the starter 11 is activated, that is, actuation of the starter 11 is imitated. Upon activation of the starter 11, cranking of the engine 10 is initiated and thus the rotary shaft 13 of the engine 10 begins rotation. Thereafter, the engine speed NE increases with increasing pinion rotational speed NP. The alternator 20 coupled to the rotary shaft 13 via the belt is rotated by rotation of the rotary shaft 13.

Thereafter, at a predefined deactivation time to deactivate the starter 11, the starter actuation command is turned off and an alternator motoring actuation command is generated. Upon generation of the alternator motoring actuation command, the controller 22 performs recognition of rotation of the rotary electric machine 21 to detect a rotating state of the rotary electric machine 21 and a phase to be excited for motoring actuation of the rotary electric machine 21. After completion of the recognition of rotation of the rotary electric machine 21, motoring actuation of the alternator 20 is initiated based on a result of the recognition of rotation of the rotary electric machine 21. In addition, after deactivation of the starter 11, combustion control is initiated at a predefined time. The engine speed NE is thereby increased by a drive torque of the starter 11 and a combustion torque of the engine 11. Thus, the engine start-up is completed.

However, in such a start-up method, an operating abnormality may occur in the alternator 20. For example, the recognition of rotation of the rotary electric machine 21 performed in the controller 22 may be delayed by some factors. In such an event, engine start-up performance may be deteriorated.

Figure 3:
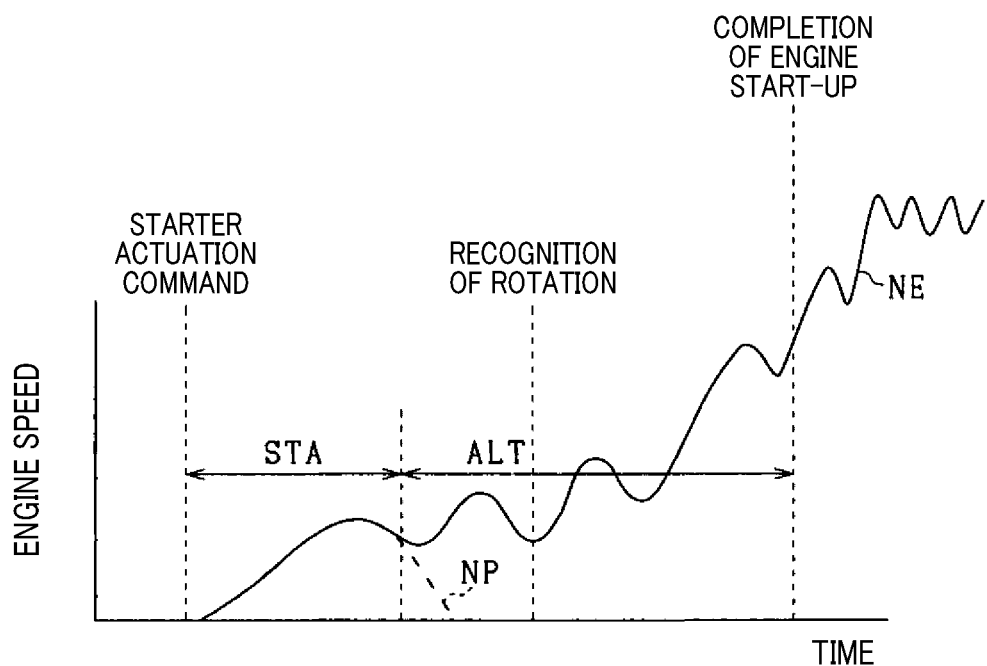
FIG. 3 is another example of engine start-up using both a starter and an alternator.

FIG. 3 illustrates an example of engine start-up when the recognition of rotation of the rotary electric machine 21 performed in the controller 22 is delayed.

In such an event, detection of the phase to be excited for motoring actuation of the rotary electric machine 21 is delayed in the controller 22, which causes a delay of initiation of motoring actuation of the alternator 20. Thus, engine speed NE rise is slowed down immediately after the deactivation of the starter 11. It may thus require time until completion of start-up of the engine 10, which may deteriorate the engine start-up performance. Therefore, it is desired to properly detect an operating abnormality occurring on the alternator 20 and generate a rapid response to the abnormality.

In the present embodiment, the controller 22 is configured to, under a condition where the engine rotary shaft 13 is rotating after deactivation of the starter 11, determine whether or not recognition of rotation of the rotary electric machine 21 is complete, and if it is determined that recognition of rotation of the rotary electric machine is not complete, perform predefined fail-safe processing responding to an operating abnormality in the alternator 20. More specifically, the controller 22 is configured to, in the fail-safe processing, output a signal for re-actuating the starter 11 to the ECU 30. That is, if the recognition of rotation of the rotary electric machine 21 is not complete at a time for the alternator 20 to actuate, it is assumed that an operating abnormality has occurred in the alternator 20, thereby re-actuating the starter 11. This configuration can prevent reduction in the engine speed NE caused by the operating abnormality in the alternator 20, thereby preventing deterioration of engine start-up performance.

In the present embodiment, if and only if a rotating state of the rotary electric machine 21 and a phase to be excited for motoring actuation of the rotary electric machine 21 are both detected, it is determined that the recognition of rotation of the rotary electric machine 21 is complete. Detection of the rotating state of the rotary electric machine 21 is performed on a condition that the rotational speed of the rotary electric machine 21 is detected within a predefined rotational speed range within a predetermined time period after transmission of the alternator motoring actuation command from the ECU 30 to the controller 22 or on a condition that the rotational speed of the rotary electric machine 21 has risen.

Processing to be performed in the ECU 30 will now be described with reference to a flowchart of FIG. 4. This processing is performed in the ECU 30 iteratively every predetermined control period.

At step S101, the ECU 30 determines whether or not it is before completion of start-up of the engine 10. For example, before completion of restart of the engine 10 subsequent to the engine 10 being automatically stopped under stop-and-go control, it is determined that it is before completion of start-up of the engine 10. If it is after completion of start-up of the engine 10, the process flow ends. If it is before completion of start-up of the engine 10, the process flow proceeds to step S102. At step S102, the ECU 30 determines whether or not an engine speed NE is less than a predetermined threshold TH1, where the threshold TH1 is a criterion value for determining whether to deactivate the starter 11 or alternator 20. For example, TH1=500 rpm. If at step S102 it is determined that the engine speed NE is less than the predetermined threshold TH1, then the process flow proceeds to step S103.

At step S103, it is determined whether or not the starter 11 is in re-actuation. In the present embodiment, the ECU 30 is configured to re-actuate the starter 11 under a prescribed condition. If "YES" is selected step S103, then process flow proceeds to step S131. If "NO" is selected step S103, then the process flow proceeds to step S104.

At step S104, the ECU 30 determines whether or not it is after transmitting an alternator motoring actuation command to the controller 22. That is, the ECU 30 determines whether or not it is after permitting actuation of the alternator 20. If "NO" is selected at step S104, then process flow proceeds to step S105. At step S105, the ECU 30 determines whether or not the starter 11 is in actuation. More specifically, upon restarting the engine 10, the ECU 30 determines whether or not the first actuation command for actuating the starter 11 has been generated. If "NO" is selected at step S105, that is, if the starter 11 is not in actuation, then the process flow proceeds to step S106. At step S106, the ECU 30 determines that a start-up request for the engine 10 has been generated. If a request for restarting the engine 10 is generated after the engine has been automatically stopped, then "YES" is selected at step S106 and the process flow proceeds to step S107. Until generation of the re-start request for the engine 10 after the engine 10 has been automatically stopped, "NO" is selected at step S106, and then the process flow ends.

At step S107, the ECU 30 transmits a starter actuation command to the relay 33 to activate the starter 11. If the starter 11 is activated, then "YES" is selected at step S105 and then the process flow proceeds to step S111. At steps S111 and S112, the ECU 30 determines whether or not it is time to deactivate the starter 11 after activation of the starter 11. That is, at step S111, the ECU 30 determines whether or not a predetermined time period has elapsed after transmission of the starter actuation command. At step S112, the ECU 30 determines the position of the engine 10 is just before top dead center (TDC) (e.g., 5 to 45 degrees before top dead center (BTDC)). The position of the engine 10 just before top dead center corresponds to a time just before a compression reaction force in a cylinder of the engine 10 becomes maximal. If at steps S111 and S112 it is determined that it is not time to deactivate the starter 11 after activation of the starter 11, then the process flow ends. That is, actuation of the starter 11 will be continued.

If "YES" is selected at step S111 or S112, that is, if it is determined that it is time to deactivate the starter 11, then the process flow proceeds to step S113. At step S113, the ECU 30 places the relay 33 in a nonconducting state to deactivate the starter 11. Thereafter, at step S114, the ECU 30 transmits the alternator motoring actuation command to the controller 22.

If it is determined that the alternator motoring actuation command has been transmitted ("YES" branch of step S104), then the process flow proceeds to step S121. At step S121, the ECU 30 determines whether or not a signal for re-actuating the starter 11 (hereinafter referred to as a re-actuation signal) has been received from the controller 22. In the present embodiment, the controller 22 is configured to, if determining that after deactivation of the starter 11, rotation recognition in the controller 22 is not complete, generate the re-actuation signal for re-actuating the starter 11. Therefore, if the ECU 30 has received the re-actuation signal, then "YES" is selected at step S121. Thereafter, the process flow proceeds to step S123, where the ECU 30 transmits the starter actuation command again to the relay 33, thereby re-activating the starter 11. At step S124, the ECU 30 determines to thereafter perform fuel injection using a fuel injection valve. More specifically, in order to carry out combustion in the first coming combustion process after the re-transmission of the actuation command to the starter 11, fuel injection is carried out in a compression process just before the first coming combustion process.

If "NO" is selected at step S121, then the process flow proceeds to step S122. At step S122, the ECU 30 determines whether or not the engine speed NE is increasing under a condition where actuation of the alternator 20 is permitted. It should be noted that, in the power transfer assembly 16 containing the pulley and belt, slipping of the belt with respect to the pulley may occur. When the belt is slipping with respect to the pulley, a drive torque of the alternator 20 may not be properly transferred to the engine rotary shaft 13, which may cause engine speed NE rise to be slowed down. However, a rotating state of the rotary electric machine 21 may normally be detected by the controller 22. It is therefore difficult to detect slipping of the belt.

In the present embodiment, the ECU 30 is configured to determine whether or not the engine speed NE is increasing. With this configuration, unless the engine speed NE is increasing, slipping of the belt is deemed to be occurring even if the re-actuation signal for the starter 11 has not been received from the controller 22. More specifically, at step S122, the ECU 30 determines whether or not a rise rate of the engine speed NE is equal to or greater than a predetermined threshold. If "NO" is selected at step S122, then the process flow proceeds to step S123 to re-actuate the starter 11. If "YES" is selected at step S122, then the process flow ends.

If the starter 11 is re-actuated (or actuated again) at step S123, then "YES" is selected at step S103 and then the process flow proceeds to step S131. At step S131, the ECU 30 determines whether or not a signal for deactivating the starter 11 (referred to as a starter deactivation signal) has been received from the controller 22. In the present embodiment, if, during re-actuation of the starter 11, it is determined in the controller 22 that recognition of the rotation of the rotary electric machine 21 is complete, and then the starter deactivation signal is generated. Therefore, upon the ECU 30 receiving the starter deactivation signal from the controller 22, "YES" is selected at step S131. If "YES" is selected at step S131, then the process flow proceeds to step S132 to terminate re-actuation of the starter 11.

Upon initiation of motoring actuation of the alternator 20, the engine speed NE begins to rise. If "NO" is selected at step S102, then the process flow proceeds to step S141. At step S141, the ECU 30 transmits a signal for turning off the alternator motoring actuation command, thereby terminating motoring actuation of the alternator 20. Thereafter, the process flow ends. Start-up of the engine 10 is thus completed.

If the starter deactivation signal is not received during re-actuation of the starter 11 ("NO" branch of step S131), then the process flow ends. That is, re-actuation of the starter 11 is continued. During re-actuation of the starter 11, the engine speed NE will rise. If "NO" is selected at step S102, then the process flow proceeds to step S141 to deactivate the starter 11 and then ends. That is, in such a case, start-up of the engine 10 will be completed by the starter 11 alone.

Figure 5:
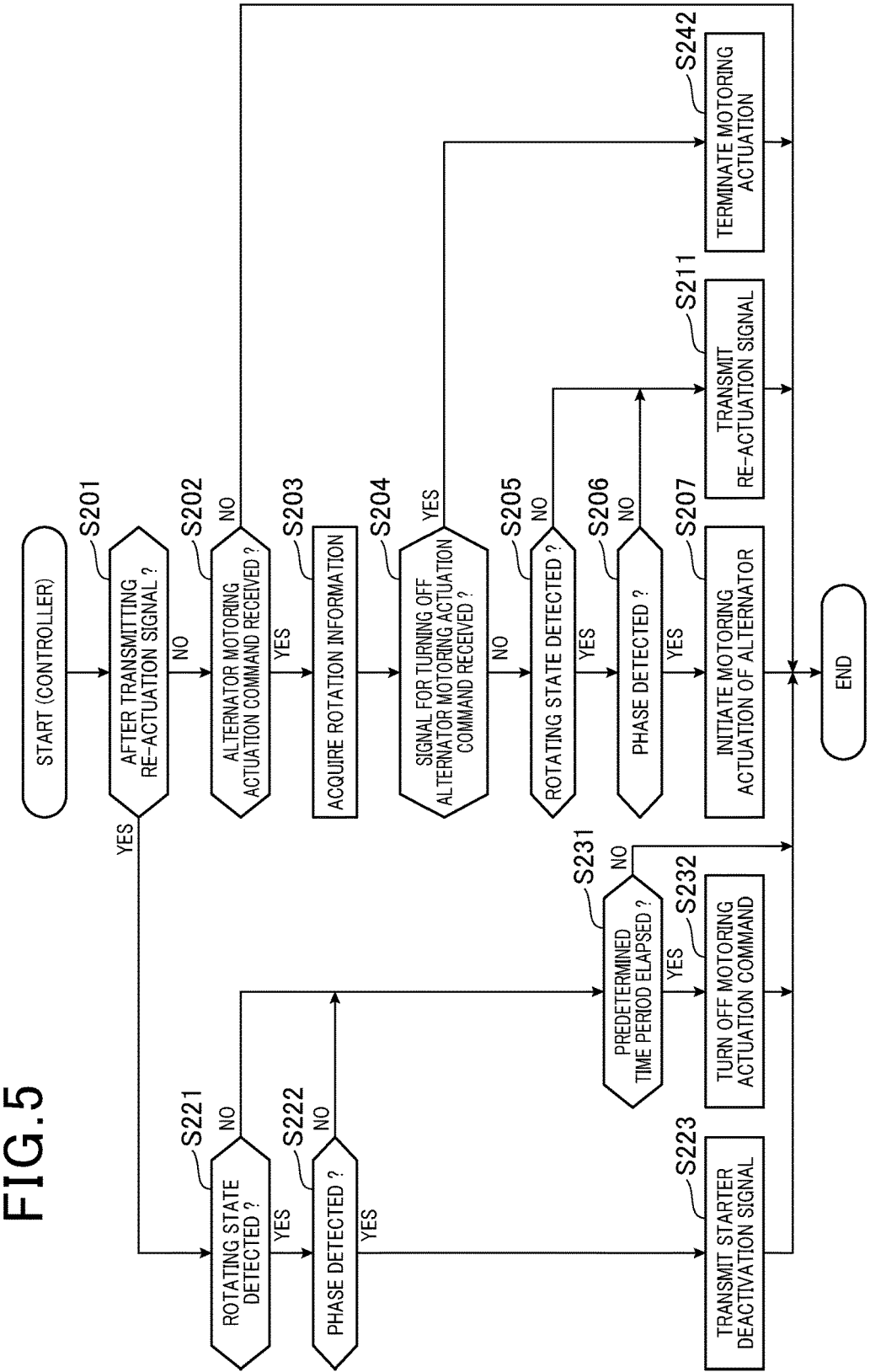
FIG. 5 is a flowchart of processing to be performed in the controller.

The engine start-up control to be performed in the controller 22 will now be described with reference to FIG. 5. Processing of FIG. 5 is performed in the controller 22 iteratively every predetermined control period. This control period may different from that of the processing to be performed in ECU 30.

The controller 22 may be configured as a microcomputer or integrated circuit (IC). Various functions of the controller 22 may be implemented by CPU executing computer programs stored in ROM or loaded to RAM, or may be realized not only in software, but also in hardware, for example, in logic circuitry, analog circuitry, or combinations thereof.

At step S201, the controller 22 determines whether or not the re-actuation signal for the starter 11 has been transmitted to the ECU 30. If "NO" is selected at step S201, then the process flow proceeds to step S202. At step S202, the controller 22 determines whether or not the alternator motoring actuation command has been received from the ECU 30. If "NO" is selected at step S202, that is, if motoring actuation of the alternator 20 is not permitted, the process flow ends without initiating motoring actuation of the alternator 20.

In "YES" is selected at step S202, that is, if motoring actuation of the alternator 20 is permitted, then the process flow proceeds to step S203 to acquire rotation information of the rotary electric machine 21. The rotation detector 23 detects an induced voltage or current generated in the rotor or stator coils of the rotary electric machine 21 in conjunction of rotation of the rotor of the rotary electric machine 21. The controller 22 acquires from the rotation detector 23 signals of the induced voltage or current in chronological order as the rotation information.

Figure 1B:
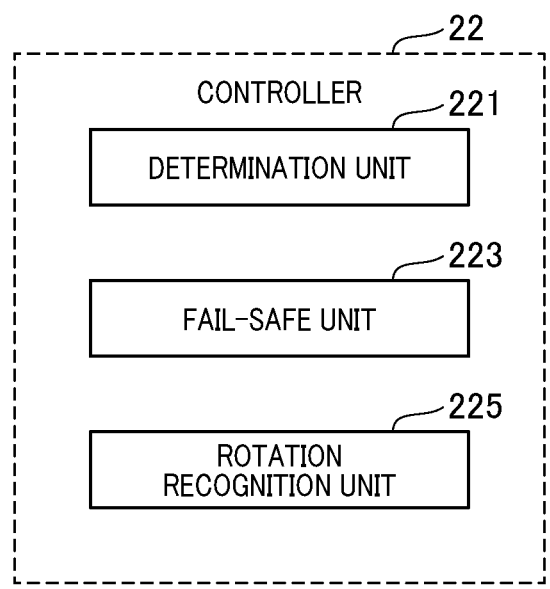
FIG. 1B is a functional diagram of a controller.

The recognition unit of the controller shown in FIG. 1B is responsible for execution of step S203. FIG. 1B illustrates a functional diagram of the controller 22 of the alternator 20.

Thereafter, at step S204, the controller 22 determines whether or not the signal for turning off the alternator motoring actuation command has been received. If "NO" is selected at S204, the process flow proceeds to step S205.

At steps S205, S206, the controller 22 determines whether or not the recognition of rotation of the rotary electric machine 21 is complete. That is, at step S205, the controller 22 determines based on the rotation information acquired at step S203 whether or not a rotating state of the rotary electric machine 21 has been detected within a predetermined time period after receipt of the alternator motoring actuation command. At step S206, the controller 22 determines based on the rotation information acquired at step S203 whether or not the phase to be excited for motoring actuation of the alternator 20 has been detected within a predetermined time period after receipt of the alternator motoring actuation command.

The determination unit 221 of the controller 22 shown in FIG. 1B is responsible for execution of steps S205, S206.

If "YES" is selected in each of steps S205, S206, that is, if the recognition of rotation of the rotary electric machine 21 is complete, then the process proceeds to step S207. At step S207, the controller 22 initiates motoring actuation of the alternator. Then, the process flow ends. That is, the engine 10 is started by motoring actuation of the alternator 20 without re-actuating the starter 11.

If "NO" is selected in step S205 or S206, that is, if the recognition of rotation of the rotary electric machine 21 is not complete, then it is determined that there is an operating abnormality in the alternator 20 and then the process flow proceeds to step S211. At step S211, the controller 22 transmits a re-actuation signal that is a signal for re-actuating the starter 11 to the ECU 30. Upon the ECU 30 receiving the re-actuation signal, the starter 11 is re-activated.

The fail-safe unit 223 of the controller 22 shown in FIG. 1B is responsible for execution of step S211.

In the processing of FIG. 5, the rotating state detection (at step S205) and the phase detection (at step S206) are performed in this order. Alternatively, the rotating state detection (step S205) and the phase detection (step S206) may be performed in the reversed order.

If "YES" is selected at step S201, that is, if the controller 22 has transmitted the re-actuation signal for the starter 11, then the process flow proceeds to step S221. At steps S221, S222, under a condition where the starter 11 is in re-actuation, the controller 22 determines again whether or not the recognition of rotation of the rotary electric machine 21 is complete. That is, at step S221, it is determined whether or not the rotating state of the rotary electric machine 21 has been detected, and at step S222, it is determined whether or not the phase to be excited for motoring actuation of the alternator 20 has been detected.

If "NO" is selected at step S221 or S222, that is, if, under a condition where the starter 11 is in re-actuation, the controller 22 determines that the recognition of rotation of the rotary electric machine 21 is not complete, then the process flow proceeds to step S231. At step S231, the controller 22 determines whether or not a predetermined time period has elapsed after transmission of the re-actuation signal for the starter 11. If "YES" is selected at step S231, that is, if the recognition of rotation of the rotary electric machine 21 is not complete even after the predetermined time period has elapsed after transmission of the re-actuation signal for the starter 11, then the controller turns off the motoring actuation command for the alternator 20 at step S232. That is, if, under a condition where the starter 11 is in re-actuation, it is determined that the recognition of rotation of the rotary electric machine 21 is not complete, the controller 22 terminates the recognition of rotation of the rotary electric machine 21, so that the engine 10 is started by actuation of the starter 11.

If "NO" is selected at step S231, the process flow ends. If "YES" is selected in each of steps S221 and S222 within the predetermined time period after transmission of the re-actuation signal for the starter 11, then the process flow proceeds to step S223. At step S223, the controller 22 transmits a starter deactivation signal that is a signal for terminating re-actuation of the starter 11 to the ECU 30 That is, if, under a condition where the starter 11 is in re-actuation, the controller 22 determines that the recognition of rotation of the rotary electric machine 21 is complete, then the controller 22 terminates re-actuation of the starter 11. Then, the engine 10 is started by motoring actuation of the alternator 20.

Theater, upon receipt of the signal for turning off the alternator motoring actuation command from the ECU 30, "YES" is selected at step S204, and then the process flow proceeds to step S242. At step S242, the controller terminates motoring actuation of the alternator 20. Thus, start-up of the engine is complete.

Figure 6:
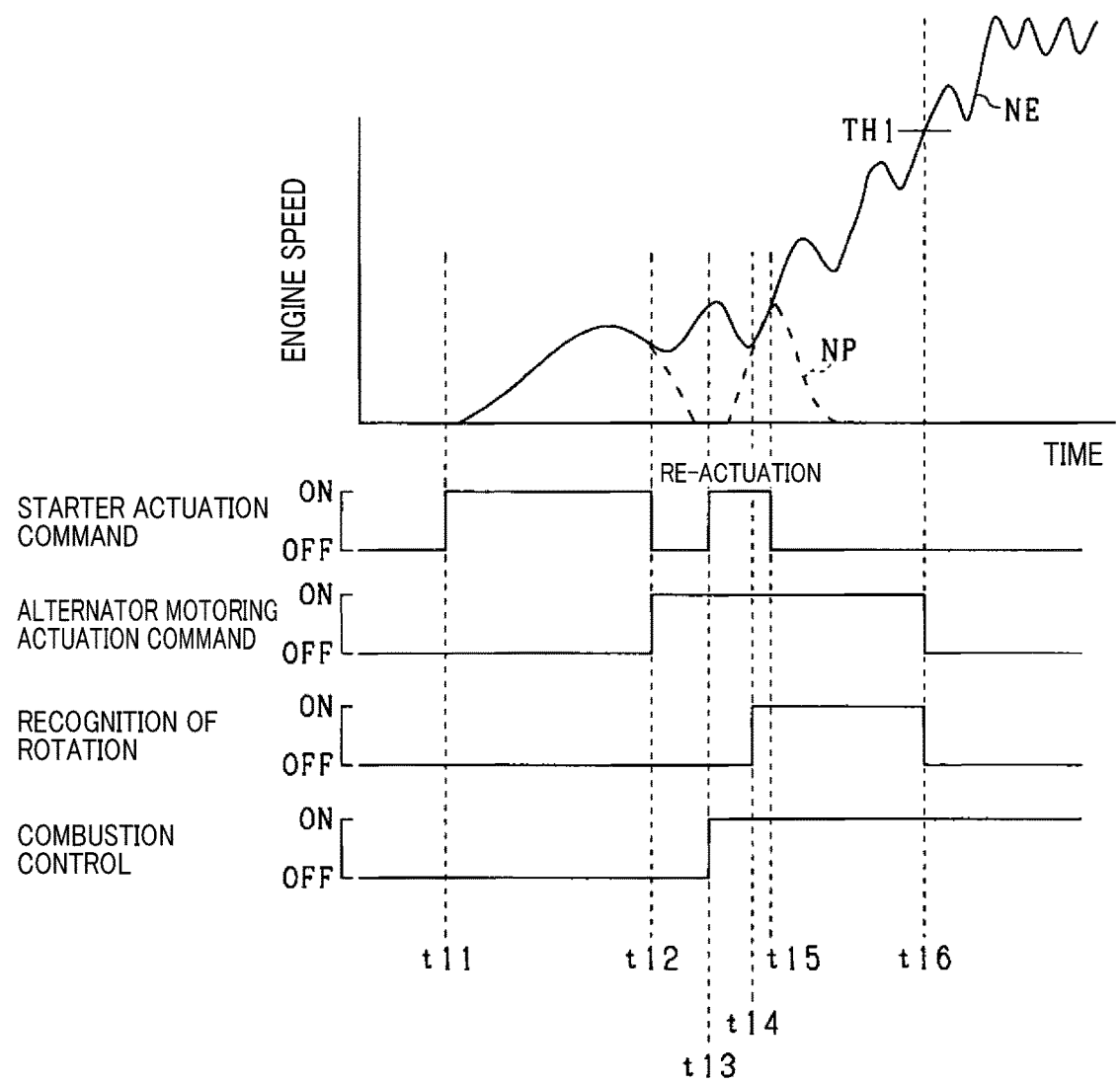
FIG. 6 is a timing diagram of engine start-up control.

FIG. 6 is a timing diagram of engine start-up control. FIG. 6 illustrates a scenario where the engine 10 is automatically stopped and then restarted.

The engine 10 is stationary before time t11. At time t11, an engine start-up request for starting the engine 10 is generated in response to a driver action. More specifically, the engine start-up request may be generated in response to acceleration or braking cancellation by the driver. Upon initial start-up of the engine 10, the engine start-up request may be generated in response to a driver's key operation.

When the starter actuation command is generated in the ECU 30 in response to the engine start-up request, the starter 11 is activated. The rotary shaft 13 of the engine 10 rotates as the starter 11 is actuated. The alternator 20 is rotated by rotation of the rotary shaft 13 of the engine 10. Thereafter, at time t12 just before the TDC is reached, the starter actuation command is turned off and then the alternator motoring actuation command is generated. When motoring actuation of the alternator 20 is permitted by the alternator motoring actuation command, the controller 22 carries out the recognition of rotation of the rotary electric machine 21.

Unless, under a condition where motoring actuation of the alternator 20 is permitted by the alternator motoring actuation command, the recognition of rotation of the rotary electric machine 21 is complete, the starter actuation command is generated again at time 13, thereby activating the starter 11 again. Re-actuation of the starter 11 allows the pinion rotational speed NP to rise again and allows the pinion 12 and the ring gear 14 to mate with each other, which can prevent reduction in the engine speed NE. At time t13, the combustion control is activated. More specifically, the first fuel injection is carried out in a compression process just before the first coming combustion process after re-activation of the starter 11, thereby providing combustion in this combustion process.

At time t14 during re-actuation of the starter 11, the controller 22 determines that the recognition of rotation of the rotary electric machine 21 is complete, in response to which the starter deactivation signal is generated and transmitted to the ECU 30. Upon the ECU 30 receiving the starter deactivation signal, the starter actuation command is turned off and the starter 11 is thereby deactivated at time t15. A time period of t14 to t15 is a delay caused by communications between the ECU 30 and the controller 22.

After time t15, engine start-up is carried out by actuation of the alternator 20 alone. A drive torque of the alternator 20 and a combustion torque generated in the combustion process allow the engine speed NE to rise.

When the engine speed NE reaches the threshold TH1 at time t16, the signal for turning off the alternator motoring actuation command is transmitted form the ECU 30 to the controller 22. Motoring actuation of the alternator 20 is thus terminated.

The present embodiment configured as above can provide the following advantages.

In the configuration set forth above, the controller 22 is configured to, under a condition where the engine rotary shaft 13 is rotating after deactivation of the starter 11, determine whether or not recognition of rotation of the rotary electric machine 21 is complete, and if it is determined that recognition of rotation of the rotary electric machine 21 is not complete, carry out predefined fail-safe processing responding to an operating abnormality in the alternator 20. With this configuration, determining that the recognition of rotation of the rotary electric machine 21 is not complete, under a condition where, after deactivation of the starter 11, the alternator 20 is being rotated by rotation of the rotary shaft 13, indicates that there is an abnormality in the alternator 20. Carrying out the predefined fail-safe processing in such an event allows a rapid response to an operating abnormality in motoring actuation of the alternator 20. With this configuration, an abnormality in the alternator 20 can be appropriately detected, which can prevent deterioration of engine start-up performance.

More specifically, in the fail-safe processing, a signal for re-actuating the starter 11 is outputted to the ECU 30, thereby triggering the ECU 30 to re-actuate the starter 11. In such an event, re-actuating the starter 11 can increase the engine speed NE again even if the engine speed NE has reduced after the last deactivation of the starter 11. Therefore, even if initiation of motoring actuation of the alternator 20 is delayed from the last deactivation of the starter 11, the engine 10 can advantageously be started.

In addition, the ECU 30 is configured to re-actuate the starter 11 and initiate fuel injection of the engine 10. With this configuration, not only a drive torque of the starter 11, but also a combustion torque of the engine 10 can be applied to the engine rotary shaft 13. Therefore, even in the event there is a failure in the alternator 20, the engine 10 can be started.

Under a condition where the alternator 20 is being rotated by rotation of the rotary shaft 13, if a rotating state of the rotary electric machine 21 is detected and if a phase to be excited for motoring actuation of the alternator 20 is detected, then the motoring actuation of alternator 20 is initiated. In this confutation, therefore, if at least one of the rotating state of the rotary electric machine 21 and the phase to be excited for motoring actuation of the alternator 20 is not detected, then it is determined that the recognition of rotation is not complete, which triggers the starter 11 to be re-actuated. With this configuration, a status of recognition of rotation of the rotary electric machine 21 can be appropriately detected, which allows a rapid response to deterioration of engine start-up performance caused by an operating abnormality in the alternator 20.

In the configuration set forth above, if, after re-activation of the starter 11, it is determined that recognition of rotation of the rotary electric machine 21 is not complete, then the alternator 20 is deactivated, more specifically, the motoring actuation command for the alternator 20 is turned off. In the event, after re-activation of the starter 11, it is determined that recognition of rotation of the rotary electric machine 21 is not complete, there may be a failure in the alternator 20. In the presence of such a failure, even if the motoring actuation command for the alternator 20 is continued, motoring actuation of the alternator 20 is less likely to be initiated. Energy consumptions can therefore be suppressed by turning off the motoring actuation command for the alternator 20.

Modifications

There will now be described some modifications that may be devised without departing from the spirit and scope of the present invention.

Figure 4:
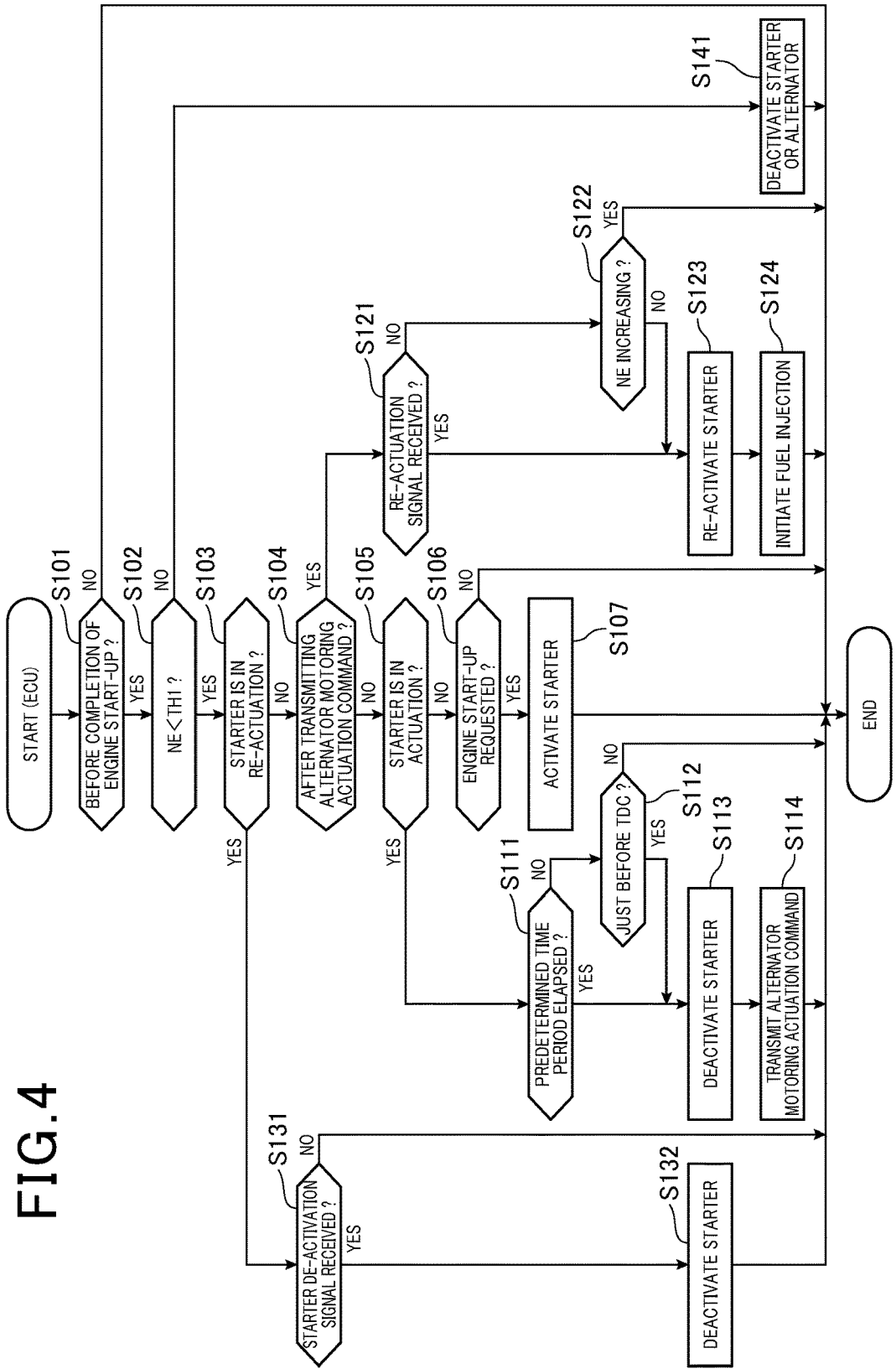
FIG. 4 is a flowchart of processing to be performed in an ECU.

(M1) In the embodiment set forth above, the ECU 30 is configured to, upon receipt of the re-actuation signal for re-actuating the starter 11, re-actuate the starter 11 and initiate fuel injection using the fuel injection valve (at steps S123, S124 of FIG. 4.). Alternatively, the fuel injection timing after initiation of the engine start-up may be changed. For example, the ECU 30 may be configured to, if, after re-activating the starter 11, it is determined that the recognition of rotation of the alternator 20 is not complete, then initiate the fuel injection of the engine 10 before re-actuation of the starter 11 is terminated. More specifically, the ECU 30 may be configured to, if it is determined that the recognition of rotation of the alternator 20 is not complete within a time period after re-activation of the starter 11, initiate the fuel injection of the engine 10. That is, in FIG. 4, "NO" is selected at step S131 and the fuel injection of the engine 10 is initiated upon expiration of the predetermined time period.

Normally, the fuel injection of the engine 10 is initiated after deactivation of the starter 11. In such an alternative embodiment, the fuel injection of the engine 10 is initiated before termination of re-actuation of the starter 11. If it is determined that recognition of rotation of the alternator 20 is not complete even after re-activation of the starter 11, it is likely that there is a failure in the alternator 20. In such an event, initiating the fuel injection of the engine 10 at an earlier time allows the engine speed NE to be increased by a drive torque of the starter 11 and a combustion torque of the engine 11, thereby preventing deterioration of engine start-up performance.

(M2) In the embodiment set forth above, if the rotating state of the rotary electric machine 21 and the phase to be excited for motoring actuation of the alternator 20 are both detected (at steps S205, S206), then it is determined that the recognition of rotation of the rotary electric machine 21 is complete. Additionally or alternatively, if the rotating state of the rotary electric machine 21 and the phase to be excited for motoring actuation of the alternator 20 are both detected and if initiation of motoring actuation of the alternator 20 is detected, then it may be determined that the recognition of rotation of the rotary electric machine 21 is complete. The determination as to whether or not motoring actuation of the alternator 20 has been initiated may be determined based on whether or not current control of the rotary electric machine 21 has been initiated synchronously with the phase in the rotational drive 24.

In such an embodiment, if the rotating state of the rotary electric machine 21 and the phase to be excited for motoring actuation of the alternator 20 are both detected and if initiation of motoring actuation of the alternator 20 is detected, then the engine 10 may be started by motoring actuation of the alternator 20 without re-actuating the starter 11. If at least one of the rotating state of the rotary electric machine 21 and the phase to be excited for motoring actuation of the alternator 20 is not detected or if initiation of motoring actuation of the alternator 20 is not detected, it may be determined that that the recognition of rotation of the rotary electric machine 21 is not complete. Then the re-actuation signal for the starter 11 may be transmitted (as in step S211).

(M3) In the embodiment set forth above, if the ECU 30 receives the starter deactivation signal during re-actuation of the starter 11 (at step S131), the ECU 30 deactivate the starter 11 (at step S132). Alternatively, the ECU 30 may be configured to, at a predefined deactivation time after receipt of the starter deactivation signal, deactivate the starter 11. In such an embodiment, an additional step at which the ECU 30 determines a timing of deactivation of the starter 11 after receipt of the starter deactivation signal may be inserted between steps S131 and S132 of FIG. 4. The ECU 30 may be configured to determine whether or not the position of the engine 10 is a predefined position just before top dead center (TDC), as in step S112.

(M4) In the embodiment set forth above, the re-actuation signal for re-actuating the starter 11 is transmitted from the controller 22 to the ECU 30, and then the ECU 30 re-actuates the starter 11. Alternatively, the controller 22 may be configured to re-actuate the starter 11. In such an embodiment, no communications between the controller 22 and the ECU 30 that may cause a delay of deactivation the starter 11 are not required, which allows more rapid re-actuation of the starter 11.

(M5) In the embodiment set forth above, actuation time periods of the starter 11 and the alternator 20 do not overlap. Alternatively, the actuation time periods of the starter 11 and the alternator 20 may overlap. The ECU 30 may be configured to simultaneously generate the starter actuation command and the alternator motoring actuation command, or may be configured to, during the starter actuation command being ON, generate the alternator motoring actuation command. In such an embodiment, within a predetermined time period after the starter actuation command is turned off, it may be determined whether the recognition of rotation of the rotary electric machine 21 is complete in the controller.

(M6) In the embodiment set forth above, the engine 10 is started by using both the DC starter 11 and the AC alternator 20. Alternatively, the engine 10 may be started by using two AC starters. In such an embodiment, the two AC starters may be a high-power and a low-power AC starter, where the high-power AC starter is actuated first and the low-power AC starter is actuated subsequently.

(M7) In the embodiment set forth above, the alternator 20 used as the engine start apparatus contains no engine speed sensor. Alternatively, the alternator 20 used as the engine start apparatus may contain an engine speed sensor.

What is claimed is:

1. A starter controller incorporated in a starter control system for controlling actuation of a first starter and a second starter to start an engine, the second starter being an alternating-current (AC) starter, the system being configured to start actuation of the first starter in response to an engine start-up request, and before completion of engine start-up, terminate the actuation of the first starter and then start actuation of the second starter while the second starter is being rotated by rotation of an engine rotary shaft caused by the actuation of the first starter, the starter controller comprising:
    a determination unit configured to, under a condition where the engine rotary shaft is rotating after termination of the actuation of the first starter, determine whether or not recognition of rotation of the second starter is complete; and
    a fail-safe unit configured to, when the determination unit determines that the recognition of rotation of the second starter is not complete, perform predefined fail-safe processing responding to an abnormality in the second starter, after the termination of the actuation of the first starter.

2. The starter controller according to claim 1, wherein the fail-safe unit is configured to, in the predefined fail-safe processing, output a signal for re-actuating the first starter.

3. The starter controller according to claim 2, wherein:
    the starter control system further comprises a first-starter controller configured to control actuation of the first starter, the first-starter controller being in communication with the starter controller;
    the starter controller further comprises a rotation recognition unit configured to initiate the recognition of rotation of the second starter in response to an actuation command signal received from the first-starter controller; and
    the fail-safe unit is configured to, in the predefined fail-safe processing, output to the first-starter controller the signal for re-actuating the first starter.

4. The starter controller according to claim 1, wherein the determination unit is configured to, at least when determining that the second starter is in a rotating state, when determining that a phase to be excited to actuate the second starter has been detected, or when determining that the actuation of the second starter has been started, determine that the recognition of rotation of the second starter is complete.

5. An engine start apparatus comprising:
    a starter controller incorporated in a starter control system for controlling actuation of a first starter and a second starter to start an engine, the system being configured to start actuation of the first starter in response to an engine start-up request, and before completion of engine start-up, terminate the actuation of the first starter and then start actuation of the second starter while the second starter is being rotated by rotation of an engine rotary shaft caused by the actuation of the first starter;
    the second starter that is an alternating-current (AC) starter; and
    a rotation detector configured to detect rotation of the second starter based on an induced voltage or induced current generated in coils of the second starter,
    wherein the starter controller comprises:
        a determination unit configured to, under a condition where the engine rotary shaft is rotating after termination of the actuation of the first starter, determine whether or not recognition of rotation of the second starter is complete; and
        a fail-safe unit configured to, when the determination unit determines that the recognition of rotation of the second starter is not complete, perform predefined fail-safe processing responding to an abnormality in the second starter, after the termination of the actuation of the first starter.

6. The engine start apparatus according to claim 5, wherein the fail-safe unit is configured to, in the predefined fail-safe processing, output a signal for re-actuating the first starter.

7. The engine start apparatus according to claim 6, wherein:
    the starter control system further comprises a first-starter controller configured to control actuation of the first starter, the first-starter controller being in communication with the starter controller;
    the starter controller further comprises a rotation recognition unit configured to initiate the recognition of rotation of the second starter in response to an actuation command signal received from the first-starter controller; and
    the fail-safe unit is configured to, in the predefined fail-safe processing, output to the first-starter controller the signal for re-actuating the first starter.

8. The engine start apparatus according to claim 5, wherein the determination unit is configured to, at least when determining that the second starter is in a rotating state, when determining that a phase to be excited to actuate the second starter has been detected, or when determining that the actuation of the second starter has been started, determine that the recognition of rotation of the second starter is complete.

9. A starter control system for controlling actuation of a first starter and a second starter to start an engine, the system being configured to start actuation of the first starter in response to an engine start-up request, and before completion of engine start-up, terminate the actuation of the first starter and then start actuation of the second starter while the second starter is being rotated by rotation of an engine rotary shaft caused by the actuation of the first starter, the starter control system comprising:
    a first controller configured to control actuation of the first starter; and
    a second controller configured to control actuation of the second starter that is an alternating-current (AC) starter, the second controller being communicable with the first controller, the second controller comprising:
        a determination unit configured to, under a condition where the engine rotary shaft is rotating after termination of the actuation of the first starter, determine whether or not recognition of rotation of the second starter is complete; and a fail-safe unit configured to, when the determination unit determines that the recognition of rotation of the second starter is not complete, perform predefined fail-safe processing responding to an abnormality in the second starter, after the termination of the actuation of the first starter, wherein:

the fail-safe unit of the second controller is configured to, in the predefined fail-safe processing, output a signal for re-actuating the first starter; and the first controller is configured to, upon receipt of the signal for re-actuating the first starter from the second controller, re-actuate the first starter.

10. The starter control system according to claim 9, wherein the first controller is configured to, when the determination unit of the second controller determines that the recognition of rotation of the second starter is not complete, re-actuate the first starter and start controlling combustion of the engine.

11. The starter control system according to claim 9, wherein the first controller is configured to, when, after re-actuation of the first starter is started, the determination unit of the second controller determines that the recognition of rotation of the second starter is not complete, start controlling combustion of the engine before terminating the re-actuation of the first starter.

12. The starter control system according to claim 9, wherein the first controller is configured to, when, after re-actuation of the first starter is started, the determination unit of the second controller determines that the recognition of rotation of the second starter is not complete, turn off an actuation command for the second starter.

13. A starter controller incorporated in a starter control system for controlling actuation of a first starter and a second starter to start an engine, the second starter being an alternating-current (AC) starter, the system being configured to start actuation of the first starter to crank the engine in response to an engine start-up request, and before completion of engine start-up, terminate the actuation of the first starter and then start actuation of the second starter to rotate an engine rotary shaft while the second starter is being rotated by rotation of the engine rotary shaft, the rotation of the engine rotary shaft being caused by the first starter cranking the engine, the starter controller comprising:

a determination unit configured to, under a condition where the engine rotary shaft is rotating after termination of the actuation of the first starter, determine whether or not recognition of rotation of the second starter is complete; and a fail-safe unit configured to, when the determination unit determines that the recognition of rotation of the second starter is not complete, perform predefined fail-safe processing responding to an abnormality in the second starter, after the termination of the actuation of the first starter.

* * * * *